Figure 1:
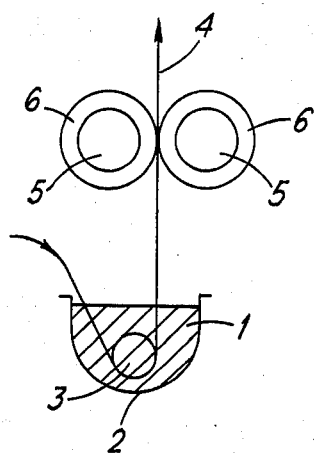

United States Patent [19]
Oschatz et al.

[11] 3,968,571
[45] July 13, 1976

[54] DRYING PROCESS

[75] Inventors: Christian Oschatz, Rummingen, Germany; Franz Somm, Riehen, Switzerland

[73] Assignee: Sandoz Ltd., Basel, Switzerland

[22] Filed: Oct. 29, 1974

[21] Appl. No.: 518,576

[30] Foreign Application Priority Data
Jan. 25, 1974 Switzerland............................ 1043/74
Nov. 2, 1973 Switzerland........................ 15453/73

[52] U.S. Cl. ........................................ 34/14; 34/70; 34/95; 34/240
[51] Int. Cl.² ........................ F26B 5/14; F26B 25/20
[58] Field of Search ............... 34/14, 69, 70, 71, 95, 34/240

[56] References Cited
UNITED STATES PATENTS
2,185,766  1/1940  Higby...................................... 34/95
2,436,028  2/1948  Wiegerink............................ 34/95 X
3,689,147  9/1972  Suzuki................................. 34/70 X Primary Examiner—John J. Camby
Attorney, Agent, or Firm—Gerald D. Sharkin; Richard E. Vila; Joseph J. Borovian

[57] ABSTRACT

Disclosed is a process for the removal of liquid from an absorbent substrate, comprising passing the substrate through the nip between a pair of rollers, at least one of said rollers having an effective surface of a sponge material, the sponge material having capillary pores, the average diameter of which is less than 1 mm and at least 50% of said pores having a diameter in the range of 0.1 to 0.001 mm, the pressure applied at the nip between said rollers being less than 1 kg per cm roller length.

15 Claims, 6 Drawing Figures

DRYING PROCESS

The invention relates to a process and apparatus for the removal of liquid from an absorbent substrate, particularly, though by no means exclusively, for the removal of excess treatment liquor from textile substrates.

Hitherto, processes for the removal of liquids from absorbent material, e.g. textile substrates, have generally involved the use of rollers, the pressure between such rollers being extremely high, e.g. of the order of 20–50 kg per cm roller length. Such pressures, however, can damage pressure sensitive substrates, such as made-up piece goods and the like. Reduction of the pressure, whilst reducing the likelihood of damage to sensitive substrates, leads to less efficiency of the liquid removal process, thus necessitating further liquid removal steps to be carried out, e.g. further squeezing operations or heat drying steps. Proposals have been made to cover the rollers with an absorbent sponge material to increase liquid removal and simultaneously to protect by the cushioning effect of the sponge the substrate being treated. A roller pressure of between 2 and 5 kg per cm roller length is, however, still required using such rollers.

It has now been found that rollers having an effective surface of a sponge material of a fairly specific and extremely fine capillary pore size lead to extremely efficient liquid removal and, not only do they require much less operating pressures but, indeed, we have found that the higher the operating pressure, the less efficient they become. This is so much so that optimum results are obtained at a pressure of up to only 100 g per cm roller length, although pressures up to 1 kg per cm roller length still give a good liquid removal effect. By use of such a sponge material the essentially squeezing action of hitherto liquid removal processes involving roller pairs is replaced by an action of positive liquid withdrawal and which obviates any appreciable pressure being applied to the substrate.

Thus, according to the invention, there is provided a process for the removal of liquid from an absorbent substrate, comprising passing the substrate through the nip of a pair of rollers, at least one roller of said pair being provided with a sponge effective surface, the pressure at the nip of the rollers being arranged at less than 1 kg per cm roller length and said sponge effective surface being of a sponge material, the average diameter of capillary pores therein being less than 1 mm and at least 50% of said pores having a diameter in the range of 0.1 to 0.001 mm.

Preferably between 60% and 80% of the capillary pores in said sponge material have a diameter in the range of 0.1 to 0.001 mm.

The sponge material employed in the invention is preferably capable of absorbing more than three times its own weight of liquid. In general, the material employed in the invention is capable of absorbing its own volume of liquid in one second or less; that is to say that a test piece of the material of cubic form placed on a liquid surface absorbs its own volume in one second or less.

Provided the sponge material is unaffected by any chemicals contained in the liquid being removed, it can be formed from a wide variety of substances, e.g. partially or wholly of polyethylene, polyisobutylene, polystyrene, polytetrafluoroethylene, polyvinyl acetate, polyvinyl ether, polyacrylic acid ester, e.g. methyl ester, polymethacrylic acid ester, polyacrylonitrile, dimethyl polysiloxane, rubber, polyvinyl chloride, polyvinyl alcohol, cellulose, polyurethane or polyalcohols cross-linked with formaldehyde, e.g. polyvinyl formal. Sponge material consisting of polyvinyl formal or comprising a blend of polyvinyl formal with cellulose are preferred, particularly the latter. The sponge material employed in the invention is commercially available.

Any pressure applied to the substrate being treated is preferably less than 100 g per cm roller length, any pressure applied being essential to ensure good contact with the substrate rather than to effect any squeezing effect. Prior to use, the sponge material employed in the invention is preferably "primed", that is to say pre-wetted with water or the liquid to be removed from the substrate, the water/liquid content, based on the weight of said sponge material, preferably being between 2 and 15%, more preferably between 5 and 10%.

As will be appreciated, in continuous processes there is a need continuously to remove the liquid picked up by the sponge material, optionally to recycle such liquid. This may be done in any of a number of conventional ways. For example, additional rollers may be provided to act on said material and exert a squeezing effect thereon to force out the liquid. Alternatively, the roller or rollers in the pair provided with the effective sponge surface may be perforated around the circumference thereof and of hollow form, a suction device being connected to the interior thereof to remove the liquid picked up by the sponge material.

By the term "sponge effective surface" is meant that the effective surface of the roller(s), i.e. that portion of the circumference thereof forming the nip is provided with the sponge covering. This may be achieved, of course, by covering the whole of the circumferential surface of the roller(s) with sponge material. Alternatively, the sponge material may be in the form of an endless band entrained around one of the rollers in the pair and around an auxiliary roller laterally displaced from said pair. Both rollers, of course, may be provided with such an endless band.

The process of the invention may be carried out on any absorbent substrate to remove liquid therefrom, particular examples being fibres, cables, filaments, textile fabrics whether knitted, woven or non-woven, carpets, textile piece goods, e.g. stockings, pullovers and the like, as well as non-textile substrates such as leather, hides, papers and films — see, for example, "Grundlage der Textilveredlung" p. 132, Dr. Spohr-Verlag, Wuppertal, 1964.

As examples of wet treatment processes to which the invention may be applied may be given washing treatments, dyeing treatments and water repellent, antistatic and dirt repellent finishing operations.

A particular application of the present invention is in the removal of treatment liquor, particularly dye liquor, from textile substrates. In such an application, the substrate, e.g. after immersion or passage through a bath of the treatment liquor, is subjected to the process of the invention, for example as an alternative to passage through a conventional pad mangle. The process of the invention may be repeated, i.e. the substrate may be passed through more than one pair of rollers, as required. By such variations as providing one or both the rollers in the pair with the sponge effective surface, varying the speed of rotation of the rollers, varying the thickness of the sponge material and providing one or more pairs of rollers, variations of the amount of liquid removed from the substrate can be achieved, as desired, with the minimum of pressure applied thereto. By controlling such variables, the pick-up by a substrate of a treatment liquor can be controlled over a wide range, e.g. within the range of 10 to 100% pickup. For example, if required, the pick-up of treatment liquor, e.g. dyeing liquor, by the substrate can be controlled to lie below the migration threshold, i.e. below the pick-up rate at which the liquor bleeds or runs from the substrate or from one area thereof to another, thereby facilitating subsequent handling thereof and obviating or alleviating the need for subsequent additional drying steps, the substrate being passed directly to the fixation stage, if desired. This threshold is generally at about 20 to 40% pick-up, depending on the nature of the substrate and treatment liquor.

The process of the invention can be carried out at normal operating speeds, i.e. with the rate of passage of substrate through the rollers in the order of from 5 to 150 m per minute.

The process of the invention is particularly suited to the dyeing of textile substrates of polyester, acrylic and polyamide fibres or blends thereof, using conventional dyes. The process may also be carried out on substrates dyed by low liquor processes, e.g. using liquor containing foam or microfoam generating agents, such as described in Belgian Patents Nos. 772,950 and 788,614.

After treatment by the process of the invention, the substrates may be after-treated in conventional manner, e.g. subjected to conventional fixing processes etc.

The following Examples serve further to illustrate the invention and the attached drawings schematically represent roller arrangements embodying the invention. In such drawings, 1 is the treatment liquor, 2 the liquor tank, 3 an immersion roller, 4 the substrate under treatment, 5 nip forming rollers, 6 sponge roller covering, 7 perforated roller, 8 squeezing roller, 9 suction device and 10 recycled liquor.

Figure 2:
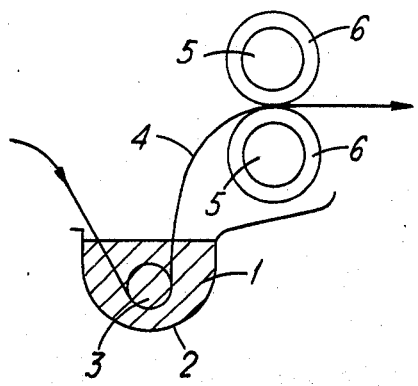
Figure 3:
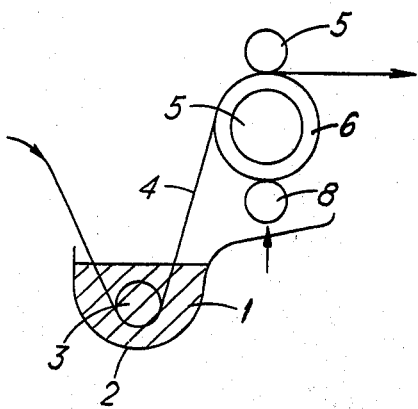
Figure 4:
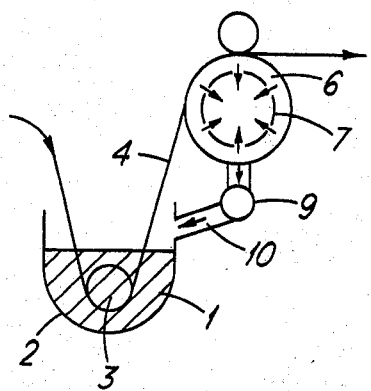
Figure 5:
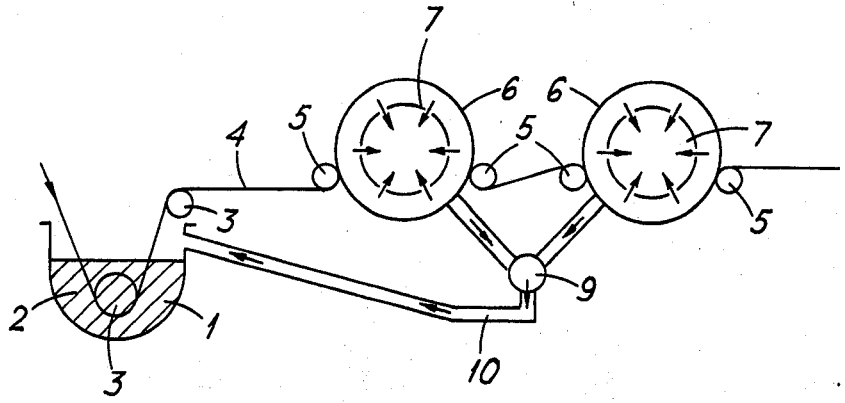
Figure 6:
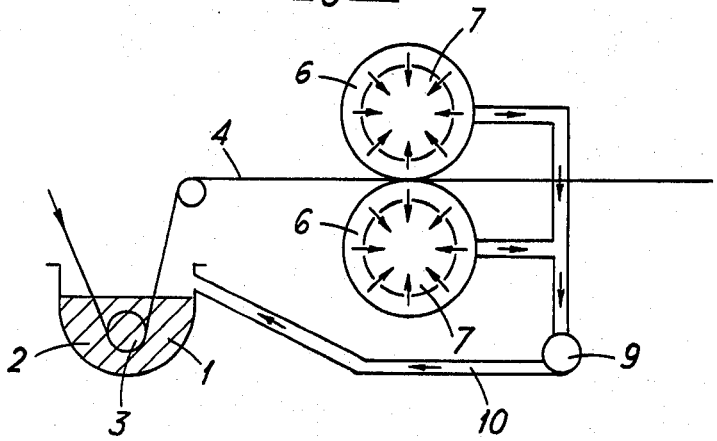

Referring to FIG. 1, there is shown a substrate 4 which is passed through a treatment liquor 1 in a liquor tank 2. The path of the substrate 4 is controlled by a roller 3. As the substrate 4 emerges from the liquor 1, it is passed between the nip of horizontally opposed rollers 5, each of which is provided with a sponge material 6 on the surface thereof, which sponge material 6 effectively removes the liquor from the substrate 4. FIG. 2 shows the nip rollers 5 vertically opposed and displaced to one side of the liquor tank 2 wherein an extended horizontal lip is shown underneath the displaced rollers, which lip collects the liquor removed from the substrate 4. FIG. 3 is an embodiment of FIG. 2 in which the sponge material 6 is removed from the upper roller 5 and an additional squeeze roller 8 is provided, which squeeze roller 8 is in contact with the sponge material 6 of the intermediate roller 5 and effectively removes the liquor therefrom. FIG. 4 depicts a further embodiment of the invention in which the substrate 4, after passing through the liquor bath 1 as described above with respect to FIG. 1, is passed between the nip of a pair of rollers which are vertically opposed and displaced to one side of the liquor tank 2, the lower roller provided with a sponge material 6 and perforations 7 around the body thereof. A suction device 9 is connected to the interior of the lower roller to remove the liquid from the sponge material 6 for return to the liquor tank 2 via conduit 10 for recycling. FIG. 5 depicts yet a further embodiment of the invention in which the substrate 4, after passing through the liquor bath 1 and over guide roller 3 is entrained over two laterally disposed rollers covered with sponge material 6, the substrate being guided over the sponge-covered rollers by means of four auxiliary guide rollers 5, the whole roller arrangement being displaced to one side of the liquor tank 2, the sponge-covered rollers being perforated around the circumference thereof. A suction device 9 is connected to the interior of each of the sponge-covered rollers to remove the liquor from the sponge material 6 for return to the liquor tank 2 via conduit 10 for recycling. FIG. 6 depicts yet still a further embodiment of the invention in which the substrate 4, after passing through the liquor bath 1 as described above with respect to FIG. 1, is passed between the nip of a pair of rollers which are vertically opposed and displaced to one side of the liquor tank 2, each of said rollers provided with a sponge material 6 and perforations 7 around the body thereof. A suction device 9 is connected to the interiors of said rollers to remove the liquor from the sponge material 6 for return to the liquor tank 2 via conduit 10 for recycling.

EXAMPLE 1

A textile material consisting of 100% polyester was impregnated with water and then squeezed on a conventional pad at a pressure of 35 kg per cm roller length. The residual moisture (pick-up) was 55%. The fabric was then squeezed on a pad, the rollers of which were covered with a polyvinyl formal sponge containing cellulose fibres. The pore size of the sponge was between 1 mm and 0.001 mm, 60% of the pores being in the range of 0.1 mm to 0.001 mm. The residual moisture at a pressure of less than 1 kg per cm roller length was only 34%. The speed was 50 m per minute in both procedures.

EXAMPLE 2

A knitted, textured polyester fabric was treated as in Example 1. With conventional squeezing at a pressure of 20 kg per cm the residual moisture was 110% but when using rollers covered with the sponge as described in Example 1, at a pressure of less than 1 kg per cm roller length, the residual moisture was 25%. The speed was 30 m per minute in both procedures.

EXAMPLE 3

A 40%/60% polyester/cotton blend fabric was treated as in Example 1. Using a conventional process and a pressure of 25 kg per cm the residual moisture was 88% but when using the rollers covered with sponge as in Example 1, at a pressure of less than 1 kg per cm roller length, the residual moisture was 55%. A speed of 60 m per minute was employed.

EXAMPLE 4

Dyeing a 100% textured knitted polyester fabric (Crimplene)

The pick-up was set at 30% by padding using sponge covered rollers according to Example 1. The following dyeing liquor was used:

| | |
|---|---|
| Disperse Blue C.I. 73 | 40 g/l |
| Alginate thickener | 2 g/l |
| Castor oil polyglycol ether (approx. 30 $CH_2CH_2O$) | 10 g/l |

After the dyeing process, the fabric was fixed, without intermediate drying, in saturated steam under pressure at 130°C for 1 minute. The aftertreatment consisted in reductive cleaning. An excellent blue dyeing with even and good penetration was obtained.

EXAMPLE 5

A textured polyester knitted fabric according to Example 4 was dyed with a pick-up of 30% (achieved by using a pad with a sponge according to Example 1) with the following dyeing liquor:

| | |
|---|---|
| Disperse Blue C.I. 73 | 40 g/l |
| Alginate thickener | 2 g/l |
| Ammonium sulphate | 2 g/l |
| Acetic acid | 1 cc/l |
| Castor oil polyglycol ether (approx. 30 $CH_2CH_2O$) | 10 g/l |

After the dyeing process the fabric was fixed, without intermediate drying, in superheated steam under normal pressure at 210°C for 1 minute. The aftertreatment consisted of reductive cleaning as in Example 4. An excellent even blue dyeing with good penetration was obtained.

EXAMPLE 6

Dyeing a 100% polyester fabric (Grilene)

The fabric was dyed with a pick-up of 30% by padding with a special pad as in Example 1 with the following dyeing liquor:

| | |
|---|---|
| Disperse Blue C.I. 73 | 40 g/l |
| Alginate thickener | 2 g/l |
| Castor oil polyglycol ether (approx. 30 $CH_2CH_2O$) | 15 g/l |

Without intermediate drying, the fabric was fixed in saturated steam at excess pressure [approximately 3 atu (atmospheric excess pressure)] at 130°C for 1 minute and then subjected to reductive cleaning as aftertreatment. An even blue dyeing with good penetration was obtained.

EXAMPLE 7

A fabric according to Example 6 was dyed as described in that Example and fixed without intermediate drying in superheated steam at normal pressure for 1 minute at 210°C. Aftertreatment consisted of the reductive cleaning described previously. Here, too an even blue dyeing with good penetration was obtained.

EXAMPLE 8

Dyeing a polyester/cotton blend

The fabric was dyed as in Examples 4 – 7 with a pick-up of 30%. The substances used, the procedure and the aftertreatment was as described in Example 7. An even blue dyeing with good penetration was obtained.

EXAMPLE 9

A polyester fabric as in Example 6 was dyed in accordance with that Example. Without intermediate drying, it was dried and fixed in folded form in superheated air at 220°C for 1 minute. The aftertreatment once more consisted of reductive cleaning. A good, even dark blue dyeing which did not show through to the reverse side was obtained.

EXAMPLE 10

Dyeing a polyamide (100% textured) fabric

The fabric was dyed with a pick-up of 25% by padding (according to Example 4) with the following liquor:

| | |
|---|---|
| Acid Red C.I. 57 | 20 g/l |
| Butyl diglycol ether | 20 g/l |
| Lauryl glycol ether sulphate (approx. 2 $CH_2CH_2O$) | 3 g/l |
| Ammonium tartrate | 8 g/l |
| Etherified locust bean flour | 3 g/l |

It was then fixed, without intermediate drying, in folded form, once in saturated steam at 100°C without pressure for 20 minutes and the second lot in steam at excess pressure for 5 minutes at 130°C. It was aftertreated by soaping at the boil. Good, brilliant, even red dyeings with excellent penetration were achieved in the case of both types of fixing.

EXAMPLE 11

Dyeing a 100% polyacrylic fabric

The fabric was dyed with a pick-up of 30% by padding (according to Example 4) with the following liquor:

| | |
|---|---|
| Basic Red C.I. 22 | 20 g/l |
| Lauryl glycol ether sulphate (approx. 2 $CH_2CH_2O$) | 5 g/l |
| Commercial mixture of a non ionic (predominately) and cationic levelling agent | 5 g/l |
| Etherified locust bean flour | 2.4 g/l |

It was then fixed in folded form, without intermediate drying, once in saturated steam at 100°C without pressure for 20 minutes, a second batch in steam with excess pressure at 130°C for 5 minutes and a third batch in superheated steam at 150°C under normal pressure. The aftertreatment consisted of soaping at the boil. The dyeing obtained were excellent in terms of evenness and penetration in the case of all three types of fixing.

What is claimed is:

1. In a process for the removal of a liquid from an absorbent substrate comprising passing the substrate through the nip of a pair of rollers, of which at least one roller of said pair is provided with a sponge material, the improvement wherein: (1) the average diameter of the capillary pores of said sponge material is less than 1 mm and the diameter of at least 50% of the capillary pores being in the range of 0.1 to 0.001 mm; and (2) the pressure at the nip of said rollers is less than 1 kg. per cm. roller length.

2. The process of claim 1, wherein between 60 and 80% of capillary pores in said sponge material are in the range of 0.1 to 0.001 mm.

3. The process of claim 1 wherein the pressure at the nip of the rollers is less than 100 g per cm roller length.

4. The process of claim 1, wherein the roller provided with said sponge material is perforated and the interior thereof is connected to a suction device to remove liquid picked up by said sponge material.

5. The process of claim 1, wherein said sponge material forms a covering for said roller.

6. The process of claim 1, wherein said sponge material is in the form of an endless band entrained around said roller and around an auxilliary roller displaced laterally from said pair of rollers.

7. The process of claim 1, wherein said sponge material is composed of polyvinyl alcohol, cellulose, polyurethane or polyvinyl alcohol cross-linked with an aldehyde, or a mixture thereof.

8. The process of claim 7, wherein said sponge material is composed of polyvinyl alcohol cross-linked with formaldehyde and set through with cellulose fibres.

9. The process of claim 1, wherein said substrate is a textile substrate and said liquid is a dye liquor.

10. The process of claim 9, wherein the dye liquor is removed from said substrate so as to reduce the pick-up of dye liquor by said substrate to below the migration threshold.

11. The process of claim 10, wherein the pick-up of dye liquor by said substrate is reduced so as to lie in the range of from 20% to 40% by weight.

12. The process of claim 9, wherein the dye liquor contains a microfoam forming agent.

13. A roller having a circumferential covering of a sponge material, the average diameter of the capillary pores of said sponge material being less than 1 mm and the diameter of at least 50% of the capillary pores being in the range of 0.1 to 0.001 mm.

14. The roller of claim 13, arranged in an assembly together with a second roller, the arrangement being such as to form a nip between said rollers.

15. A roller assembly comprising a pair of rollers arranged to form a nip therebetween, at least one of said rollers having an endless band of sponge material, the average diameter of the capillary pores of said sponge material being less than 1 mm and the diameter of at least 50% of the capillary pores being in the range of 0.1 to 0.001 mm, entrained therearound and around an auxiliary roller laterally displaced from said pair.

* * * * *